Feb. 6, 1934.  W. RUDOLPH ET AL  1,945,984
ARRANGEMENT FOR PREVENTING CROSS TALK IN SUBAQUEOUS SOUND INSTALLATIONS
Filed Sept. 23, 1929
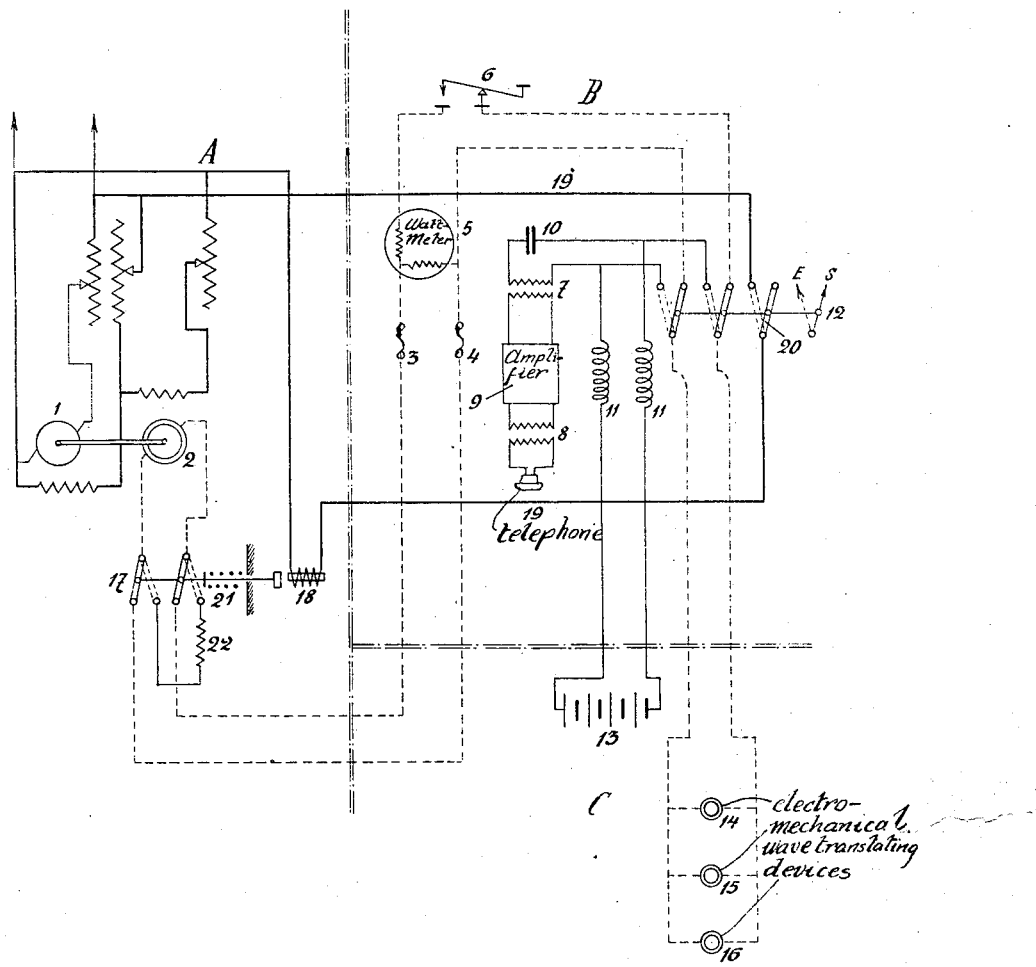

Patented Feb. 6, 1934

1,945,984

UNITED STATES PATENT OFFICE 1,945,984

ARRANGEMENT FOR PREVENTING CROSS-TALK IN SUBAQUEOUS SOUND INSTALLATIONS

Wilhelm Rudolph and Bernhard Settegast, Kiel, Germany, assignors to Electroacustic Gesellschaft mit beschrankter Haftung, a firm of Kiel, Germany Application September 23, 1929, Serial No. 394,467, and in Germany October 4, 1928

3 Claims. (Cl. 177—386)

This invention relates to subaqueous sound installations for the transmission and reception of signals, particularly to such installations wherein the same electrically operated oscillators are used for transmission and reception. In such installations, it is necessary that a part of the apparatus and instruments which are essential for operating and supervising the installation, both for transmission and reception, are combined in the same room, that is in the so-called signalling station on board ship. It follows from this that transmitting lines conveying alternating current must be laid in the same room as receiving lines and where necessary, even over the same switchboard. On the other hand, however, the installation must immediately be clear for operation on changing-over from reception to transmission, that is to say, the alternating current generator feeding the transmitters must continue to run during the reception. In this case it is evident that, even if the transmitters themselves are disconnected from the transmission line, extremely strong inductive effects between the transmitting alternating current and the receiving lines takes place and a constant, greatly disturbing sound is produced in the receiving telephone.

According to the invention, this difficulty is met through a provision whereby on changing-over from transmission to reception, the transmitting line is automatically disconnected from the alternating current generator. The disconnection is accomplished by means of a relay which is actuated by the transmit/receive change-over switch and which operates a circuit breaker located as near as possible to the generator.

An installation according to the invention is shown in the drawing. A indicates the machine room in which the motor generator which feeds the installation is installed. B is the signalling station and C the place where the actual transmitting/receiving vibrators are located. The transmitting circuit is shown in dotted lines in the drawing, the receiving circuit is lightly drawn and the direct-current circuit is heavily drawn.

In the machine room, 1 indicates the motor, and 2 the alternating current generator of the installation. In the room B are the alternating current fuses 3 and 4, the wattmeter 5, the Morse key 6 and the entire receiving arrangement consisting of the transformers 7 and 8, the amplifier 9, the blocking condenser 10 and the blocking choke 11 as well as the transmit/receive change-over switch 12. The polarization battery 13 can be arranged at any place on the ship. 14, 15, 16 are the transmitter/receivers. In the transmitter feed circuit appropriately close to the converter, a circuit-breaker 17 is inserted which is actuated by the relay 18. The circuit 19 supplies the relay with current and is opened and closed by the contact arm 20 of the transmit/receive switch 12. In the position S (transmission), the circuit 19 as well as the winding of the relay 18 are without current and the switch 17 is closed under the effect of the spring 21. On reversing the switch 12 to E (reception), relay 18 receives current opens switch 17, and thereby entirely disconnects the transmitter feed circuit.

Instead of obtaining the "off" position at the switch 17 by the relay 18 and the "on" position by the spring 21, it is also possible to proceed in the reverse manner.

Since it is frequently necessary to lay transmitting lines and receiving lines parallel to or near one another in other places on the ship, it is advisable to place the disconnecting relay 17, 18 as near as possible to the generator.

According to the invention the arrangement is further improved by connecting the two "off" contacts of switch 17, on which it is thrown during reception, to a resistance which constitutes a load for the alternating current-generator corresponding to the sound transmitters. This resistance is indicated by 22 in the accompanying drawing. By this means the result is obtained that the converter set runs with exactly the same speed during the periods of reception and, on changing-over from transmission to reception, needs no special regulation and no time for running up.

We claim:—

1. A subaqueous sound signal plant comprising an electro-mechanical wave translating device serving as a common submarine sound transmitter and receiver, separate transmitting and receiving circuits mounted closely adjacent to one another and connectible to said translating device, a continuously running and continuously energized alternating current generator included in the transmitting circuit, a sound receiver for aurally perceiving the received waves included in the receiving circuit, a change-over switch for alternately connecting said translating device to said transmitting or receiving circuit, and a cut-off switch located substantially at the generator, for disconnecting the transmitting circuit from all generator terminals closely at the generator on changing over from transmission to reception, whereby during reception the transmitting circuit is prevented from exerting detrimental inductive effects upon the closely associated receiving circuit.

2. A subaqueous sound signal plant comprising an electro-mechanical wave translating device serving as a common submarine sound transmitter and receiver, separate transmitting and receiving circuits mounted closely adjacent to one another and connectible to said translating device, a continuously running and continuously energized alternating current generator included in the transmitting circuit, a sound receiver for aurally perceiving the received waves included in the receiving circuit, a change-over switch for alternately connecting said translating device to said transmitting or receiving circuit, and a cut-off switch located substantially at the generator, and means controlled by said change-over switch for actuating said cut-off switch, for disconnecting the transmitting circuit from all generator terminals closely at the generator on changing over from transmission to reception, whereby during reception the transmitting circuit is prevented from exerting detrimental inductive effects upon the closely associated receiving circuit.

3. A subaqueous sound signal plant comprising an electro-mechanical wave translating device serving as a common submarine sound transmitter and receiver, separate transmitting and receiving circuits mounted closely adjacent to one another and connectible to said translating device, a continuously running and continuously energized alternating current generator included in the transmitting circuit, a sound receiver for aurally perceiving the received waves included in the receiving circuit, a change-over switch for alternately connecting said translating device to said transmitting or receiving circuit, and a cut-off switch located substantially at the generator, and a relay and its associated energizing circuits for actuating said cut-off switch, said change-over switch having means for controlling said energizing circuits, for disconnecting the transmitting circuit from all generator terminals closely at the generator on changing over from transmission to reception, whereby during reception the transmitting circuit is prevented from exerting detrimental inductive effects upon the closely associated receiving circuit.

BERNHARD SETTEGAST.
WILHELM RUDOLPH.